Figure 1:
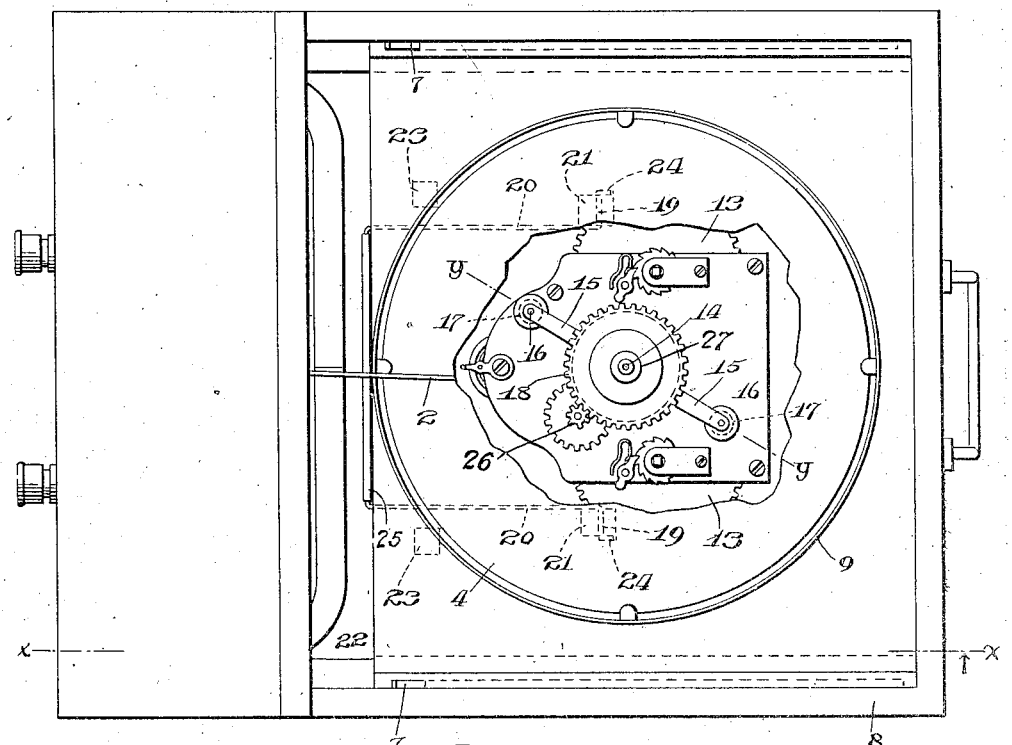

R. P. BROWN.
RECORDING INSTRUMENT.
APPLICATION FILED FEB. 4, 1909.

937,047.

Patented Oct. 19, 1909.
3 SHEETS—SHEET 1.

WITNESSES

INVENTOR
Richard P. Brown
BY Chas. A. Cutler
ATTORNEY

R. P. BROWN.
RECORDING INSTRUMENT.
APPLICATION FILED FEB. 4, 1909.
937,047.
Patented Oct. 19, 1909.
3 SHEETS—SHEET 2.
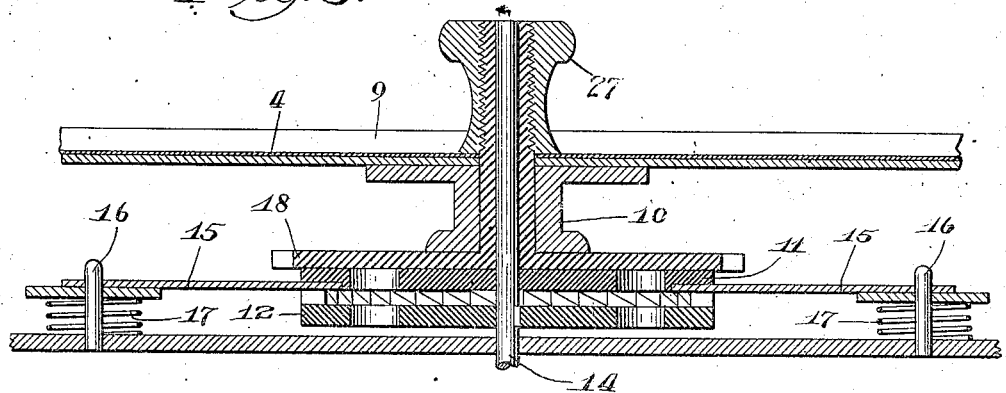
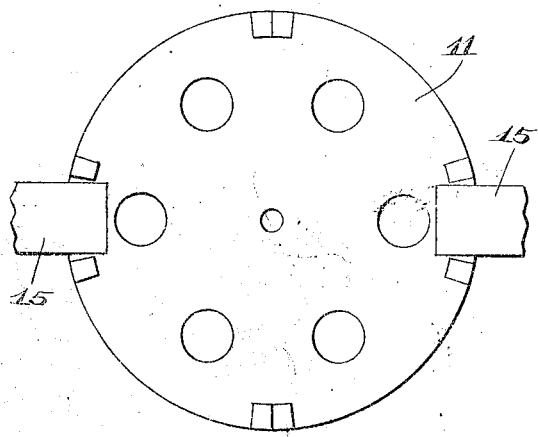
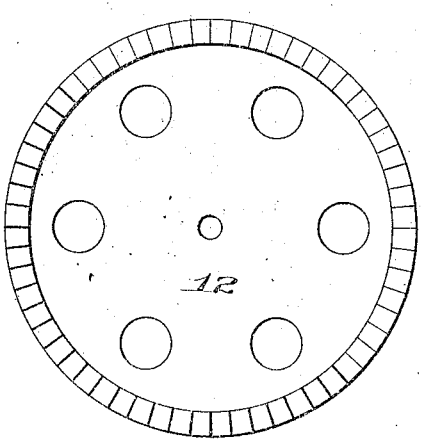
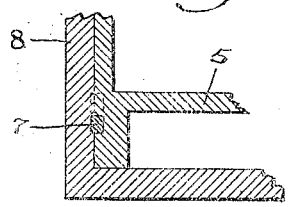
WITNESSES
INVENTOR
Richard P. Brown
BY
Chas. A. Potter
ATTORNEY

R. P. BROWN.
RECORDING INSTRUMENT.
APPLICATION FILED FEB. 4, 1909.

937,047.

Patented Oct. 19, 1909.
3 SHEETS—SHEET 3.

WITNESSES

INVENTOR
Richard P. Brown
BY Chas. A. Cutter,
ATTORNEY

_UNITED STATES PATENT OFFICE._

RICHARD P. BROWN, OF PHILADELPHIA, PENNSYLVANIA.

RECORDING INSTRUMENT.

937,047.   Specification of Letters Patent.   Patented Oct. 19, 1909.

Application filed February 4, 1909. Serial No. 475,951.

*To all whom it may concern:*

Be it known that I, RICHARD P. BROWN, a citizen of the United States, and a resident of the city and county of Philadelphia, State of Pennsylvania, have invented certain new and useful Improvements in Recording Instruments, of which the following is a specification.

My invention relates to improvements in recording instruments and more particularly to improvements in that class of instruments, pyrometers for example, in which a record is made upon a moving chart by a pen or stylus which is actuated by a milli volt meter or other instrument. In instruments of this character the pen or stylus carrying arm is usually a very delicate member the maintenance of the proper adjustment of which is absolutely essential for accuracy and it is very desirable that it should not be handled by unskilled or careless persons who might disarrange this. The charts upon which the record is traced are usually of paper which are revolved by clock-work around their centers and in contact with the pen or stylus and at certain fixed intervals the charts are renewed. In order to renew the charts it is the usual practice to lift the stylus or pen carrying arm out of the way; this is very apt to result in changing the adjustment of the arm and one object of my invention is to furnish a means whereby the chart may be removed and replaced without in any way disturbing or touching said arm.

I carry the charts, in the instrument, upon a chart holder which is rotated by clock-work, in the usual manner, and, in addition, is moved at intervals into and out of contact with the stylus or pen by mechanism driven by the clock-work, the purpose of this being to permit a free movement of the pen or stylus carrying arm. In some instruments the arm actuating means is so delicate that it cannot operate when the pen or stylus is in contact with the chart. In my apparatus the chart lies at all times perfectly flat and the stylus can contact it practically from its center to its periphery.

The chart holder and chart have some little weight notwithstanding that their construction is very light and in order to counteract this and make the work upon the clock-work as light as possible these parts are balanced upon springs as will be hereinafter more fully described. I have further provided my instrument with a device for engaging the stylus carrying arm when the chart is withdrawn. This device holds the arm steadily during the process of cleaning or inking the stylus or pen.

Figure 2:
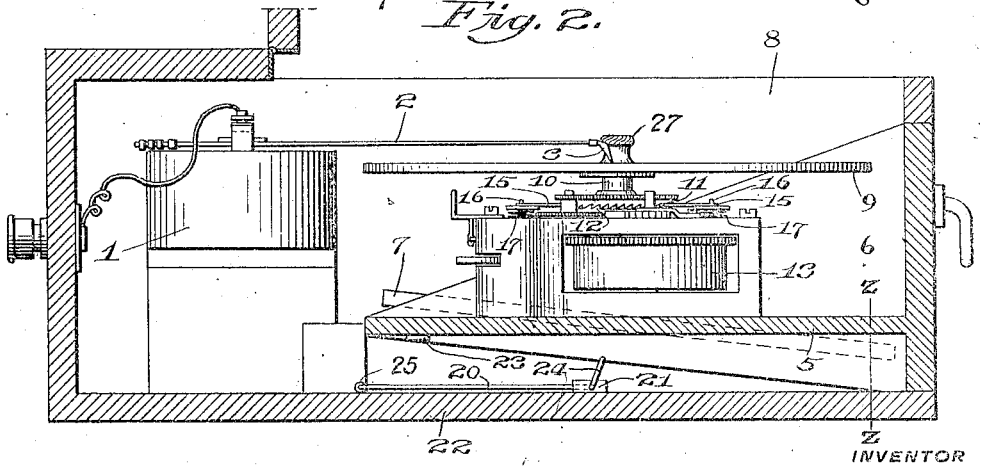
Figure 7:
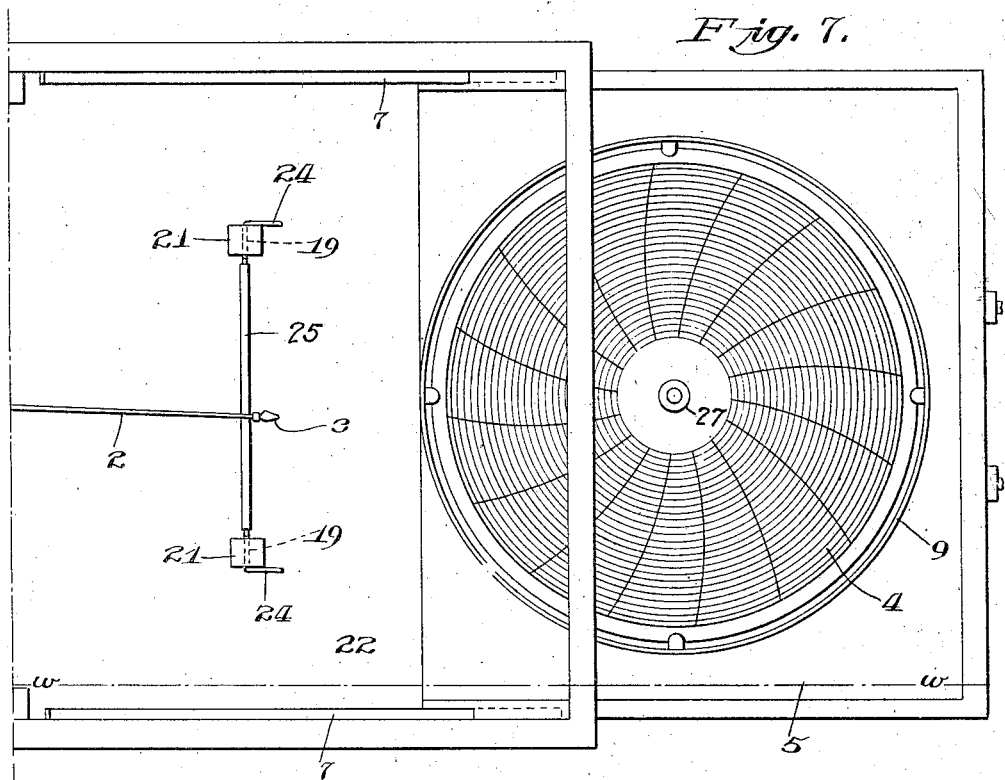
Figure 8:
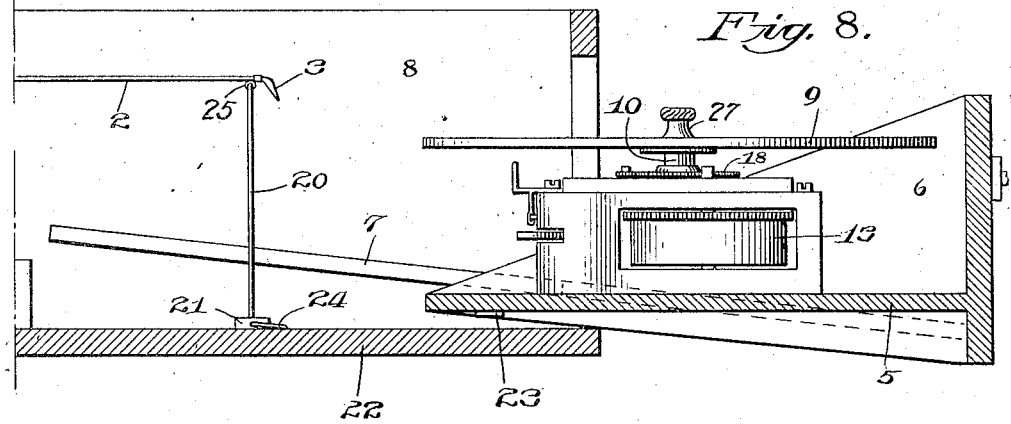

In the accompanying drawings forming part of this specification and in which similar numerals of reference indicate similar parts throughout the several views:—Figure 1, shows a plan view, partly broken away of an electric recording pyrometer constructed according to my invention; Fig. 2, a section of Fig. 1 on line X—X; Fig. 3, a section of Fig. 1. upon an enlarged scale, upon line y—y; Fig. 4, a plan of the toothed side of the driven wheel for elevating the chart holder; Fig. 5, a plan of the toothed wheel for driving the wheel shown in Fig. 4; Fig. 6, a section of Fig. 2 on line Z—Z; Fig. 7, a plan of part of the case of the instrument showing the slide, carrying the chart and connected parts, partly drawn out; Fig. 8, a section of Fig. 7 on line W—W.

1, Fig. 2, are the magnets of a milli volt meter or other instrument, and 2 the stylus or pen carrying arm. 3 is the pen or stylus, 4 the chart upon which record is made; all of these parts are of the usual construction and will not require detailed description.

The pen or stylus is adapted to contact with and to trace upon the chart 4 a line which, the chart being properly divided, forms a record of the movements of the instrument. The chart and connected parts are carried upon a slide 5, which for convenience I have shown as forming the bottom of a drawer 6 the sides of which are carried by inclined guides 7 formed upon the sides 8 of the box inclosing the instrument.

When it is necessary to remove the chart 4 the slide 5 is drawn out and by the inclination downward of the carrying guides 7, the downward movement moves the chart away from the pen or stylus which is thereby not affected or moved in any way by this movement of the chart. After the chart holder has been moved away from the arm 2, as shown in Figs. 7 and 8, the chart may be removed, a new one placed in it and the parts returned to their original positions without disturbing the arm or marring the chart by drawing it out in contact with the pen or stylus 3.

9 is the chart holder which is preferably formed of metal and carried on a support 10 which is carried by a crown-wheel 11.

12 is a crown-wheel, meshing with crown-wheel 11. The crown-wheel 12 is driven in any suitable manner from the clock train 13, preferably through the spindle 14, which forms a central guide for the chart holder 9.

15 are arms secured to the crown-wheel 11 which are prevented from rotary movement by pins 16, shown in the drawings as passing through their outer ends.

17 are springs of strength sufficient to almost, but not quite, carry the weight of the crown-wheel 11, the chart holder 9, and connected parts.

18 is a gear wheel which is fast to spindle 14; this gear wheel is driven by pinion 26, Fig. 1, which forms part of and is driven from the clock train 13 in a well known manner. The chart holder 9 is locked to the support 10 and to the hub of the gear wheel 18 by a thumb nut 27 which screws down upon the hub of the gear wheel as shown in Fig. 3. The rotation of the gear wheel 18 drives the chart holder and the other parts which are fast to the spindle 14.

To avoid friction, and to prevent the possibility of a constant contact between the pen and chart drawing all or a greater part of the ink from the pen, it is desirable that the chart and pen be in contact intermittently and for only an instant at one time. The rotary speed of the chart is usually slow and such an intermittent contact between the pen and the chart will result in a continuous line being traced.

The revolution of the spindle 14, which is driven by the clock-work 13, will cause a revolution of the crown-wheel 12 which is fast to this spindle the teeth of which will slide under the teeth of the wheel 11 lifting these teeth, the wheel 11 and chart holder and chart until the latter contacts lightly with the pen 3. As soon as the points of the teeth of wheel 12 pass the points of the teeth of wheel 11 the latter and connected parts fall by gravity and the pen and chart are separated.

As before stated the wheel 11 is prevented from rotating by the pins 16 engaging the arms 15 and the springs 17 support almost all the weight of the wheel 11 and supported parts thereby making it possible for the crown-wheel 12 to lift them. Without some such arrangement the clock-work would not be sufficiently powerful to operate them. For purposes of convenience the teeth of the upper crown-wheel 11 are interrupted as best shown in Fig. 4.

The lifting and lowering of the chart as described are of additional advantage in that when lowered the chart can be withdrawn from or placed in the machine without any danger of disturbing the pen or stylus or its carrying arm.

In order that the pen and stylus may be cleaned and inked without disturbing the adjustment of the arm 2, I make use of the arm holding and steadying device shown in Figs. 1, 2, 7 and 8.

25 is a U shaped rest the ends 19 of the sides 20 of which are bent at right angles as shown to form cranks which are carried in bearings 21 carried by the bottom 22 of the inclosing case.

23 are stops carried on the under side of the slide 5 which when the slide is drawn out engage the ends 24 of the rest 25 which are bent so as to form cranks as shown. When the slide 5 is drawn out the stops 23 engage and depress the ends 24 and the U shaped rest 25 is raised and engages the under side of the stylus arm 2 as shown in Figs. 7 and 8 and holds this arm steadily to permit the cleaning or refilling of the pen without danger of disturbing the adjustment of the arm. When the slide 5 is moved in it engages and lowers the rest to its original position.

Having thus described my invention I claim as new and desire to secure by Letters Patent:

1. In an apparatus of the character described, in combination, an arm, a stylus or pen carried by said arm, means for operating said arm, means for carrying a chart, and an inclined guide for slidably carrying said chart carrying means.

2. In an apparatus of the character described, in combination, an arm, a stylus or pen carried by said arm, means for operating said arm, means for carrying a chart, and a slidable means for moving said chart simultaneously in two directions to or from said pen or stylus.

3. In an apparatus of the character described, in combination, a chart holder, means for carrying said holder, means for rotating said holder, and means for intermittently elevating said holder.

4. In an apparatus of the character described, in combination, a chart holder, means for carrying and means for rotating said holder, springs for partially supporting the weight of said holder and connected parts, and means for intermittently elevating said holder.

5. In an apparatus of the character described, in combination, a chart holder, an interrupted crown-wheel carrying said chart holder, means, independent of said crown-wheel, for rotating said holder, means for preventing a rotation of said crown-wheel, springs for partially supporting the weight of said crown-wheel and superposed parts, a second crown-wheel engaging the teeth of said first crown-wheel, and means for driving said second crown-wheel.

6. In an apparatus of the character described, in combination, a chart holder, an interrupted crown-wheel carrying said chart holder, arms carried by said wheel, pins for preventing a rotary movement of said arms and wheel, springs for partially supporting the weight of said wheel and superposed parts, a driving crown-wheel the teeth of which are in engagement with the teeth of said first crown-wheel, means for driving said driving crown-wheel, and means for rotating said chart holder.

7. In an apparatus of the character described, in combination, a stylus or pen carrying arm and means for operating the same, a slide, a chart carrying and actuating means carried by said slide, and a rest operated by an outward movement of said slide to engage and by an inward movement of said slide to disengage said stylus or pen carrying arm.

8. In an apparatus of the character described, in combination, a stylus or pen carrying arm and means for operating the same, a slide, a chart carrying and actuating means carried by said slide, a stop carried by said slide, and a pivotally supported rest adapted to be operated by the movements of said slide and stop to cause said rest to engage and disengage said arm.

RICHARD P. BROWN.

Witnesses:
FRED. E. V. SAPPINGTON,
CHARLES A. RUTTER.